United States Patent Office 3,636,041
Patented Jan. 18, 1972

3,636,041
4,5-DIHYDRO-7H-THIENO[2,3-c]THIOPYRANS
Paul Schmidt and Kurt Eichenberger, Therwil, and Ernst Schweizer, Basel, Switzerland, assignors to Ciba Corporation, Summit, N.J.
No Drawing. Filed Feb. 25, 1969, Ser. No. 802,250
Claims priority, application Switzerland, Feb. 29, 1968, 2,980/68; Aug. 9, 1968, 12,029/68; Jan. 21, 1969, 836/69
Int. Cl. A61k 27/00; C07d 65/04
U.S. Cl. 260—332.2 C
15 Claims

ABSTRACT OF THE DISCLOSURE

Compounds of the formula

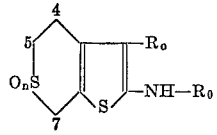

in which $R_x$ stands for acyl or hydrogen, $R_0$ for a free or functionally converted carboxyl group and $n$ for 0, 1 or 2, and which contain in at least one of the positions 5 and 7 an aryl radical and which may be further substituted in positions 4, 5 and/or 7 are useful as starting materials and as central inhibiting, antiinflammatory and antihypertensive agents.

SUMMARY OF THE DISCLOSURE

The present invention relates to new 4,5-dihyro-7H-thieno[2,3-c]thiopyrans. Especially it concerns 4,5-dihydro-7H-thieno[2,3-c]thiopyrans having the nucleus of formula

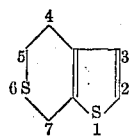

which in at least one of the positions 5 and 7 possess an aryl radical and which in the 2-position possess a free or acylated amino group and in 3-position a free or functionally converted carboxyl group, as well as their S-oxides and the salts of these compounds.

A functionally converted carboxyl group is especially a cyano group, an esterified carboxyl group or a carbamyl group.

An esterified carboxyl group is above all a carboxyl group esterified with an aliphatic alcohol, such as a lower alkanol or alkenol, for example methanol, ethanol, propanol, isopropanol, allyl alcohol, methyallyl alcohol, butanol, sec. butanol, isobutanol or amyl alcohol, a cycloaliphatic alcohol such as a cycloalkanol, for example cyclopentanol or cyclohexanol, a cycloaliphatic-aliphatic alcohol such as a cycloalkyl-lower alkanol, for example a cyclopentyl- or cyclohexyl-methanol, -ethanol or -propanol, or an araliphatic alcohol such as a benzyl alcohol or a 1-phenylethanol or 2-phenylethanol which may also be substituted in the aromatic nucleus. Possible substituents of the aromatic radical are herein above all lower alkyl radicals, for example methyl, ethyl, propyl, isopropyl, butyl, isobutyl or amyl radicals, lower alkoxy groups, for example methoxy, ethoxy, propoxy, isopropoxy, butoxy or amyloxy groups, halogen atoms, for example fluorine, chlorine or bromine atoms, and/or trifluoromethyl groups.

An acylated amino group is primarily a group of the formula

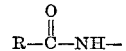

in which R represents an optionally substituted hydrocarbon radical, as for example a lower alkyl, alkenyl, aryl or aralkyl radical, for example one of those mentioned below, or a cycloalkyl or cycloalkylalkyl radical, for example an optionally lower alkylated, such as methylated, cyclopropyl, cyclopentyl, or cyclohexyl radical or cyclopropyl-, cyclopentyl- or cyclohexyl-methyl or -ethyl radical, or hydrogen.

The aryl radical in the 5- or 7-position is especially a phenyl radical which may be substituted, for example as specified below for the aryl radicals.

Sulphoxides and sulfones, i.e. 6-oxides and 6,6-dioxides, are to be understood by S-oxides.

The new compounds may contain further substituents. Thus they may especially carry further substituents in the 5- and/or 7-position, in addition to the aryl radical already mentioned. Such substituents are for example monofunctional or bifunctional optionally substituted hydrocarbon radicals or heterocyclic radicals. The following should be particularly mentioned: alkyl radicals such as lower alkyl radicals, above all those having 1 to 6 carbon atoms such as methyl, ethyl, propyl, isopropyl, straight-chain or branched butyl, pentyl or hexyl radicals bonded in any desired position, alkenyl radicals such as lower alkenyl radicals, for example allyl or methylallyl radicals, alkylene radicals such as straight-chain or branched lower alkylene radicals, for example butylene-(1,4), pentylene-(1,5) or hexylene-(1,6) radicals, or aryl or aralkyl radicals, such as especially phenyl or phenyl-lower alkyl radicals, such as benzyl, phenylethyl or phenylpropyl radicals, wherein the aromatic parts may also be substituted, or optionally substituted heterocyclic radicals which possess one heteroatom, such as for example pyridyl radicals. As substituents of aryl radicals or of the aryl part of aralkyl radicals there are above all to be mentioned: lower alkyl radicals, for example those mentioned, lower alkoxy radicals such as methoxy, ethoxy, propxy or butoxy radicals; methylenedioxy groups, halogen atoms such as fluorine, chlorine or bromine atoms, trifluoromethyl groups, hydroxyl groups, nitro groups, amino groups such as free, mono-lower alkylated or di-lower alkylated amino groups in which the lower alkyl radicals are preferably those mentioned above, or acyloxy groups or acylamino groups, wherein the acyl radicals are especially those of saturated carboxylic acids having preferably at most 8 carbon atoms, especially lower alkane-acids such as acetic acid, propionic acid or butyric acid, or phenyl-lower alkane-acids such as benzoic acids or phenylacetic acids, which may also be substituted, for example as specified above for the aryl radicals. Possible substituents of the heterocyclic radicals are above all lower alkyl radicals, for example those mentioned.

The new compounds preferably contain an aryl radical in each of positions 5 and 7.

In the 4-position, the new compounds may above all possess optionally substituted hydrocarbon radicals such as phenyl or phenyl-lower alkyl radicals, for example those mentioned, or above all lower alkyl radicals, for example those mentioned.

The new compounds possess valuable pharmacological properties, above all a central inhibiting, such as a sedative, action as can be shown by animal experiment, for example on mice, and also an anti-inflammatory action, as is found in animal experiments, for example with rats, and are therefore useful as sedatives and as antiphlogistics. They furthermore possess a blood pressure reducing action, for example on renal-hypertonic rats, and are therefore useful as hypotensive agents.

The new compounds are however also valuable intermediates for the manufacture of other useful substances, especially of pharmacologically active compounds. Thus it is possible to react, for example, the new 2-amino-4,5-dihydro-7H-thieno[2,3-c]thiopyranes which carry in at least one of the positions 5 and 7 an aryl radical and have in 3-position a functionally modified carboxyl group containing an oxo group, for example an esterified carboxyl group or a carbamyl group, or an S-oxide thereof, with a reactive acid derivative of a carboxylic acid capable of pyridine-ring closure, for example an acid of the formula R—COOH, R having the meaning indicated, such as an ester, amide, a halide (for example chloride), iminoether, anhydride, provided at least one of the two reactive acid derivatives contains a nitrogen atom. There are obtained in this manner the 4-hydroxy-5,6-dihydro-8H-thiopyrano[4',3':4,5]thieno[2,3-d]pyrimidines which contain in at least one of the positions 6 and 8 an aryl radical, or their S-oxides. Said 4-hydroxy compounds can also be obtained by cyclizing a corresponding 2-acylamino-3-carbamyl-4,5-dihydro-7H-thieno[2,3-c]thiopyrane or an S-oxide thereof.

In the 4-hydroxy compound mentioned a hydroxyl group can be converted into a halogen atom, for example by treatment with halides of sulfur or phosphorus, for example phosphorus pentachloride, phosphorus oxychloride, phosphorus chloride, or corresponding bromides.

Reaction of the resulting 4-chloro- or 4-bromo compounds with an amino-lower alkylamine leads to the 5,6-dihydro - 8H - thiopyrano[4',3':4,5]thieno[2,3-d]pyrimidines which contain the nucleus of the formula

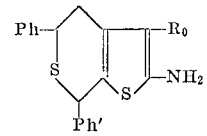

and in at least one of the positions 6 and 8 carry an aryl radical and in 4-position an amino-lower alkylamino group, and their S-oxides.

Compounds to be particularly emphasized are those of formula

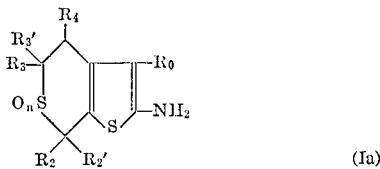

wherein $n$ represents 2, 1 or preferably 0, $R_0$ stands for a group of the formula

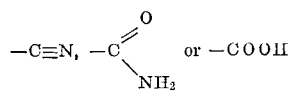

or especially for the group of the formula

in which $R_1$ represents a lower alkyl radical, especially methyl or ethyl, one of the radicals $R_2$ and $R_3$ represents a phenyl radical which is optionally substituted, for example as specified, and the other represents a lower alkyl radical, a phenyl-lower alkyl or phenyl radical which is optionally substituted, for example as specified, a pyridyl radical which is optionally substituted, for example as specified, or a hydrogen atom, $R_2'$ and $R_3'$ stand for hydrogen atoms, or either $R_2$ and $R_2'$ or $R_3$ and $R_3'$ respectively together represent an optionally C-lower alkylated pentylene(1,5) or butylene(1,4) radical and one of the other two symbols represents a hydrogen atom and the other a phenyl radical which is optionally substituted, e.g. as specified, and $R_4$ represents a lower alkyl radical or especially a hydrogen atom, and their N-lower alkanoyl derivatives.

Of this group of compounds, very special importance attaches to the compounds of general Formula Ia, wherein $n$, $R_0$, $R_1$ and $R_4$ have the significance mentioned, $R_2'$ and $R_3'$ represent hydrogen atoms and $R_2$ and $R_3$, which may be identical or different, represent phenyl radicals which are optionally substituted by one, two or more lower alkyl radicals, trifluoromethyl groups and/or especially lower alkoxy groups and/or above all halogen atoms, such as for example bromine atoms or especially chlorine atoms (with preferably at least one substituent being in the p-position), and their N-lower alkanoyl derivatives.

Compounds to be particularly emphasized are those of formula

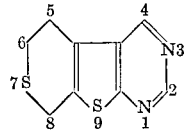

(Ib)

wherein Ph and Ph' represent phenyl radicals which are substituted by one, two or more lower alkoxy groups and/or halogen atoms, above all chlorine atoms (preferably in the p-position) and $R_0$ has the meanings given above, and especially the compounds of formula

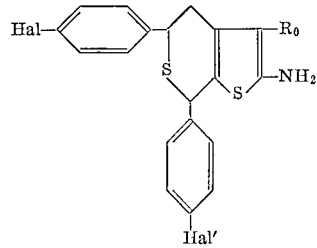

wherein $R_0$ has the meanings given above and Hal and Hal' represent fluorine, bromine or especially chlorine atoms, and especially 2-amino-3-carbethoxy-5,7-diphenyl-4,5-dihydro-7H-thieno[2,3-c]thiopyrane as well as 2-amino-3-carbethoxy - 5,7 - bis - (p-chlorophenyl)-4,5-dihydro-7H-thieno[2,3-c]thiopyrane.

The new compounds are obtained according to methods which are in themselves known.

According to a preferred procedure, a 3,4,5,6-tetrahydrothiopyran-(4)-one which is substituted by an aryl radical in at least one of positions 2 and 6, or an S-oxide thereof, is reacted with a compound of formula $$Y''—CH_2—C\equiv N$$

wherein Y'' is a free or functionally converted carboxyl group, and simultaneously or subsequently with sulfur, and, if desired, a resulting compound is acylated at the amino group in 2-position.

The reaction is effected in the usual manner, advantageously in the presence of a solvent such as a polar solvent, for example a lower alkanol such as methanol or ethanol, or dimethylformamide and preferably in the presence of a basic condensation agent such as an organic base, such as diethylamine, triethylamine, piperidine or morpholine, at ordinary or slightly elevated temperature and if desired under a nitrogen atmosphere and/or in a closed vessel under pressure.

The acylation of the amino group in 2-position is performed in the usual manner, for example by reaction with an acylating agent, such as a halide, especially the chloride, or an anhydride of a carboxylic acid, for example of one of the formula R—COOH.

The acylation is performed in the usual manner, preferably in the presence of solvents and if desired of condensing agents, for example basic condensing agents, such as pyridine.

In resulting compounds, substituents may be introduced, converted or split off. Thus for example substituents Y'' in resulting 2-amino-3-Y''-4,5-dihydro-7H-thieno[2,3-c]thiopyranes may be converted into one another.

Cyano groups may be converted into carbamyl groups or carboxyl groups in the usual manner, for example by hydrolysis, for example in the presence of a strong base such as an alkali hydroxide, for example sodium or potassium hydroxide, or in the presence of a strong acid, for example a mineral acid such as hydrochloric acid, and optionally with the addition of an oxidizing agent such as nitrous acid.

Esterified carboxyl groups and carbamyl groups may be converted into free carboxyl groups in the usual manner, for example by hydrolysis, preferably in the presence of strong bases or strong acids, for example those mentioned above. If desired, oxidizing agents such as nitrous acid may be added during the hydrolysis of carbamyl groups.

Cyano groups can also be converted into esterified carboxyl groups in the usual manner, for example by alcoholysis, such as reaction with a corresponding alcohol in the presence of sulfuric acid and ammonium chloride.

Free or esterified carboxyl groups can also be converted into carbamyl groups in the usual manner, for example by reaction with ammonia and, where appropriate, dehydration of the ammonium salt produced as an intermediate.

Free carboxyl groups can be esterified in the usual manner, for example by reaction with an appropriate alcohol, advantageously in the presence of an acid such as a mineral acid, for example sulfuric acid or hydrochloric acid, or by reaction with a corresponding diazo compound, for example a diazoalkane.

In resulting compounds which contain free hydroxyl groups on an aromatic radical, such hydroxyl groups may be etherified or acylated. The acylation takes place in the usual manner, for example by reaction with a halide, especially the chloride, or an anhydride of a carboxylic acid. The etherification takes place in the usual manner, for example by reaction with an alkyl halide, such as chloride, bromide, or iodide, or dialkyl sulfate, preferably in the presence of a strong base.

In resulting compounds which contain an acylated hydroxyl group, the latter can be split to give the free hydroxyl group. Acylated hydroxyl groups are for example those mentioned above. The splitting off is for example effected hydrolytically, catalyzed by acids or bases, for example with sodium hydroxide solution, as appropriate.

In resulting compounds which possess alkoxy radicals on an aromatic ring, such radicals can be converted into free hydroxyl groups in the usual manner. This conversion is for example effected by hydrolysis, above all by means of strong acids, such as for example hydriodic acid or hydrobromic acid and optionally in the presence of light metal halides such as aluminum bromide or boron bromide, or also with pyridine hydrochloride or aluminum chloride in pyridine.

In resulting compounds which contain aryl radicals capable of nitration, the latter may be nitrated. The nitration is effected in a manner which is in itself known, for example by treatment with a mixture of concentrated sulfuric acid and concentrated nitric acid or with the mixed anhydride of nitric acid and a carboxylic acid, for example a lower alkanecarboxylic acid such as acetic acid.

In resulting compounds which contain nitroaryl radicals, the latter can be reduced to aminoaryl radicals, for example by means of catalytically activated hydrogen such as hydrogen in the presence of a hydrogenation catalyst, for example a platinum, nickel or palladium catalyst, such as platinum oxide, Raney nickel or palladium charcoal.

In resulting acylamino compounds the acyl radicals may be split off in the usual manner, for example by hydrolysis, preferably in the presence of acid or basic catalysts.

Resulting S-unsubstituted compounds can be oxidized to the S-oxides (sulfoxides) or S-dioxides (sulfones).

The oxidation to the sulfoxides or sulfones may be effected in a known manner, for example by reaction with an S-oxidizing agent such as per-acids such as especially peracetic acid, perbenzoic acids or phthalic-mono-peracids which may also be substituted, for example by halogen atoms. In this reaction the sulfoxides are obtained at lower temperatures, that is to say with good cooling or when using only 1 mol equivalent of the oxidizing agent, whilst on warming and/or using at least 2 mol equivalents of the oxidizing agent the sulfones are obtained.

Resulting S-oxides can be oxidized to the S-dioxides. This oxidation takes place in a known manner, for example as in the oxidation described above which leads to the dioxides.

These subsequent reactions may be carried out individually or in combination and in any desired sequence.

Depending on the process conditions and starting substances the final substances are obtained in the free form or in the form of their acid addition salts, which is also comprised by the invention. Thus for example basic, neutral or mixed salts, and optionally also hemihydrates, monohydrates, sesquihydrates or polyhydrates thereof, may be obtained. The acid addition salts of the new compounds may be converted to the free compound in a manner which is in itself known, for example by means of basic reagents such as alkalis or ion exchangers. On the other hand the resulting free bases can form salts with organic or inorganic acids. In order to manufacture acid addition salts, acids which are suitable for the formation of therapeutically usable salts are especially used. As such acids there may for example be mentioned: hydrohalic acids, sulfuric acids, phosphoric acids, nitric acid, perchloric acid, aliphatic, alicyclic, aromatic or heterocyclic carboxylic or sulfonic acids such as formic, acetic, propionic,succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicylic or p-aminosalicylic acid, embonic acid, methanesulfonic, ethanesulfonic, hydroxyethanesulfonic and ethylenesulfonic acid; halogenobenzenesulfonic, toluenesulfonic, naphthalenesulfonic or sulfanilic acid; methionine, tryptophane, lysine or arginine.

Compounds having a free carboxyl group may be obtained in the free form or in the form of their salts with bases. Resulting free acid compounds may be converted in the usual manner, for example by reaction with corresponding basic agents, into the salts with bases, above all into therapeutically usable salts with bases, for example salts with organic amines, or metal salts. Possible metal salts are above all alkali metal salts or alkaline earth metal salts such as sodium, potassium, magnesium or calcium salts. Free acids may be liberated from the salts in the usual manner, for example by reaction with acid agents.

The salts mentioned, or other salts, as for example the picrates, may also be used for the purification of the new compounds, for example by converting the free compounds into their salts, isolating these and again converting them into the free compounds. As a result of the close relationships between the new compounds in the free form and in the form of their salts, the free compounds are, in the preceding and subsequent text, where appropriate also to be understood to include the corresponding salts in respect of sense and purpose.

Depending on the choice of the starting substances and procedures the new compounds may be present as optical antipodes, racemates or isomer mixtures (racemate mixtures).

Resulting isomer mixtures (racemate mixtures) may be separated into the two stereoisomeric (diastereomeric) pure racemates in a known manner on the basis of the physicochemical differences of the constituents, for example by chromatography and/or fractional crystallization.

Resulting racemates can be resolved according to known methods, for example by recrystallisation from an optically active solvent, by means of micro-organisms, or by reaction with an optically active acid which forms salts with the racemic compound and separation of the salts obtained in this manner, for example on the basis of their differing solubilities, into the diastereomers from which the antipodes can be liberated by the action of suitable agents. Particularly commonly used optically active acids are for example the D- and L-forms of tartaric acid, di-o-toluyltartaric acid, malic acid, mandelic acid, camphorsulfonic acid or quinic acid. The more active of the two antipodes is advantageously isolated.

If isomerisation occurs during a reaction then, if desired, the separation can again be carried out, for example as described above, after the reaction has taken place.

The invention also relates to those embodiments of the process according to which one starts from a compound obtainable as an intermediate at any stage of the process and carries out the remaining process stages or in which a starting substance formed under the reaction component is optionally present in the form of its salts.

It is appropriate to use such starting substances for carrying out the reactions according to the invention as lead to the initially especially mentioned groups of final substances and especially to the final substances which have been particularly described or emphasised.

The starting substances are known or may, where they are new, be obtained according to methods which are in themselves known.

The new compounds may for example be used in the form of pharmaceutical preparations in which they are present in the free form or optionally in the form of their salts, especially of the therapeutically usable salts, mixed with an organic or inorganic, solid or liquid excipient which is for example suitable for enteral or parenteral administration. Suitable substances for forming the latter are those which do not react with the new compounds, such as for example water, gelatine, lactose, starch, stearyl alcohol, magnesium stearate, talc, vegetable oils, benzyl alcohols, gum, propylene glycols, white petroleum jelly or other known medicinal excipients. The pharmaceutical preparations may for example be in the form of tablets, dragées, capsules or suppositories, or in a liquid form as solutions (for example as an elixir or syrup), suspensions or emulsions. They are optionally sterilized and/or contain auxiliary substances such as preservatives, stabilizers, wetting agents or emulsifiers, solubilizing agents or salts for regulating the osmotic pressure or buffers. They may also contain other therapeutically valuable substances. The pharmaceutical preparations are formulated according to usual methods.

The active compounds may also be utilized in the form of feedstuffs or of additives for animal fodder. Herein the usual extenders and diluents or feedstuffs are for example used.

The invention is described in more detail in the following examples.

EXAMPLE 1

13.4 g. of 2,6-diphenyl-2,3,5,6-tetrahydro-thiopyran-4-one, 5.65 g. of ethyl cyanacetate, 1.6 g. of powdered sulfur and 5 ml. of morpholine are suspended in 50 ml. of absolute ethanol and stirred for 2 hours in a bath at 45° C. After allowing the mixture to stand for about 16 hours, the precipitated reaction product is filtered off and washed with ethanol. A mixture of the cis- and trans-forms of 2-amino - 3-carbethoxy-5,7-dipheynl-4,5-dihydro-7H-thieno [2,3-c]thiopyrane of formula

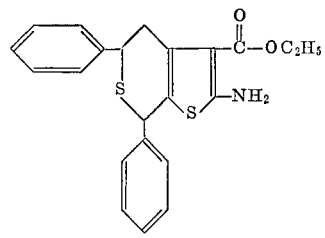

is thus obtained and this, after recrystallization from a large quantity of absolute ethanol, froms yellowish crystals of melting point 212–214° C.

EXAMPLE 2

16.85 g. of 2,6-bis(p-chlorophenyl)-2,3,5,6-tetrahydro-thiopyran-4-one, 5.65 g. of ethyl cyanacetate, 1.6 g. of powdered sulfur and 5 ml. of morpholine are suspended in 50 ml. of absolute ethanol and stirred for 2 hours in a bath at 45° C. and thereafter for a further 4 hours at room temperature. The precipitated reaction product is filtered off, triturated with ethanol and again filtered off. A mixture of the cis- and trans-form of 2-amino-3-carbethoxy - 5,7 - bis-(p-chlorophenyl)-4,5-dihydro-7H-thieno [2,3-c]thiopyrane of formula

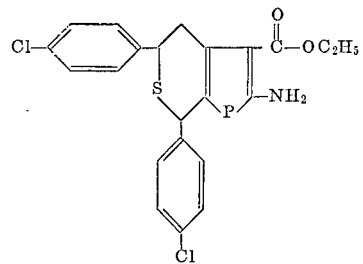

is thus obtained and this, when recrystallized from absolute ethanol, has a melting point of 90–100° C. and forms yellowish crystals.

EXAMPLE 3

29.6 g. of 2,6-bis(p-tolyl)-2,3,5,6-tetrahydro-thiopyran-4-one, 11.3 g. of ethyl cyanacetate, 3.2 g. of powdered sulfur and 10 ml. of morpholine are suspended in 100 ml. of absolute ethanol and stirred for 4 hours in a bath at 50° C. and thereafter for a further 8 hours at room temperature. The precipitated reaction product is filtered off. Recrystallization from ethanol yields the 2-amino-3-carbethoxy - 5,7-bis-(p-tolyl)-4,5-dihydro-7H-thieno[2,3-c]thiopyrane of the formula

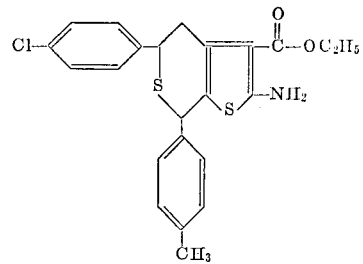

melting point 158–160° C.

The 2,6 - bis - (p-tolyl)-2,3,5,6-tetrahydro-thiopyran-4-one used as the starting product may for example be manufactured as follows:

130 g. of 1,5-bis-(p-tolyl)-penta-1,4-dien-3-one and 115 g. of anhydrous sodium acetate are heated to boiling in 3.5 l. of 90% strength ethanol, whilst stirring. Thereafter a vigorous stream of hydrogen sulfide gas is introduced for 7 hours. After cooling, a stream of air is passed through for a short time and 2 l. of water are then added. The mixture is stirred for a further 3 hours and the resulting precipitate then filtered off. Recrystallization from ethanol yields the 2,6-bis-(p-tolyl)-2,3,5,6-tetrahydro-thiopyran-4-one in the form of white crystals of melting point 127–130° C.

EXAMPLE 4

32.8 g. of 2,6-bis-(p-methoxyphenyl)-2,3,5,6-tetrahydro-thiopyran-4-one, 11.3 g. of ethyl cyanacetate, 3.2 g. of powdered sulfur and 10 ml. of morpholine in 150 ml. of absolute ethanol are stirred for 8 hours in a bath at 50° C. and thereafter for a further 4 hours at room temperature. On trituration, a solid product crystallises out from the reaction solution and this is filtered off and boiled with ethanol. The 2-amino-3-carbethoxy-5,7-bis(p-methoxyphenyl) - 4,5-dihydro-7H-thieno[2,3-c]thiopyrane of the formula

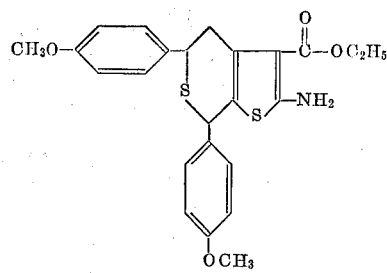

of melting point 170–180° C. is thus obtained.

EXAMPLE 5

22.4 g. of 2,6-bis(3,4,5-trimethoxyphenyl)-2,3,5,6-tetrahydro-thiopyran-4-one, 5.65 g. of ethyl cyanacetate, 1.6 g. of powdered sulfur and 5 ml. of morpholine are suspended in 100 ml. of absolute ethanol and stirred for 4 hours in a bath at 50° C. and thereafter for a further 10 hours at room temperature. The precipitated reaction product is filtered off and boiled with ethanol. 2-amino-3-carbethoxy - 5,7 - bis-(3,4,5-trimethoxyphenyl)-4,5-dihydro-7H-thieno[2,3-c]thiopyrane of the formula

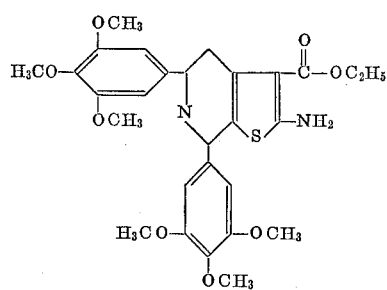

of melting point 202–203° C. is thus obtained.

The 2,6-bis-(3,4,5-trimethoxy-phenyl)-2,3,5,6-tetrahydro-thiopyran-4-one used as the starting product may for example be manufactured as follows:

28.5 g. of 1,5-bis-(3,4,5-trimethoxyphenyl)-penta-1,4-dien-3-one and 17 g. of anhydrous sodium acetate are heated to boiling in 2 l. of 90% strength methanol, whilst stirring. By introducing a stream of hydrogen sulfide gas for 7 hours and subsequent mixing with 2 l. of water whilst cooling, 2,6-bis-3,4,5-trimethoxy-phenyl)-2,3,5,6-tetrahydro-thiopyran-4-one is obtained after recrystallization from 50% strength methanol in the form of white crystals of melting point 174–175° C.

EXAMPLE 6

30.4 g. of 2,6-bis-(p-fluorophenyl)-2,3,5,6-tetrahydro-thiopyran-4-one, 11.3 g. of ethyl cyanacetate, 3.2 g. of powdered sulfur and 10 ml. of morpholine are suspended in 100 ml. of absolute ethanol and stirred for 4 hours in a bath at 50° C. and thereafter for a further 8 hours at room temperature. After filtering off the reaction product and recrystallizing from absolute ethanol, 2-amino-3-carbethoxy-5,7-bis-(p-fluorophenyl)-4,5-dihydro - 7H-thieno-[2,3-c]thiopyran of the formula

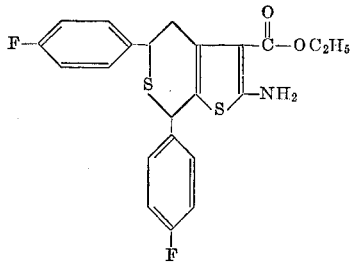

of melting point 161–162° C. is obtained.

The 2,6-bis-(p-fluorophenyl)-2,3,5,6-tetrahydro-thiopyran-4-one used as the starting product can for example be manufactured as follows:

79 g. of 1,5-bis(p-fluorophenyl)-penta-1,4-dien-3-one and 80 g. of anhydrous sodium acetate in 2 l. of 90% strength ethanol are heated to boiling whilst stirring. By introducing a stream of hydrogen sulfide gas for 6 hours and subsequently gradually adding 2 l. of water whilst cooling, the 2,6-bis-(p-fluorophenyl)-2,3,5,6-tetrahydro-thiopyran-4-one of melting point 125–126° C. is obtained after recrystallization from ethanol.

EXAMPLE 7

16.8 g. of 2,6-bis-(o-chlorophenyl)-2,3,5,6-tetrahydro-thiopyran-4-one, 5.65 g. of ethyl cyanacetate, 1.6 g. of powdered sulfur and 5 ml. of morpholine in 50 ml. of absolute ethanol are stirred for 5 hours in a bath at 50° C. and thereafter for a further 8 hours at room temperature. After filtering off the reaction product and recrystallizing from ethanol, 2-amino-3-carbethoxy-5,7-bis-(o-chlorophenyl)-4,5-dihydro-7H-thieno[2,3-c]thiopyrane of the formula

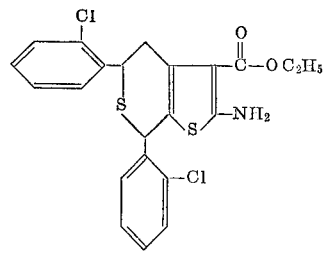

of melting point 166–167° C. is obtained.

The 2,6-bis-(o-chlorophenyl)-2,3,5,6-tetrahydrothiopyran-4-one used as the starting product may for example be manufactured as follows:

80 g. of 1,5-bis-(o-chlorophenyl)-penta-1,4-dien-3-one and 65 g. of anhydrous sodium acetate are heated to boiling in 3 l. of 90% strength ethanol, whilst stirring. By introducing a stream of hydrogen sulfide gas for 6 hours and subsequently adding 2 l. of water whilst cooling, 2,6-bis-(o-chlorophenyl)-2,3,5,6-tetrahydro - thiopyran-4-one of melting point 120–122° C. is obtained after recrystallization from ether.

EXAMPLE 8

16.8 g. of 2,6-bis-(m-chlorophenyl)-2,3,5,6-tetrahydro-thiopyran-4-one, 5.65 g. of ethyl cyanacetate, 1.6 g. of powdered sulfur and 5 ml. of morpholine are suspended in 100 ml. of absolute ethanol and stirred for 5 hours in a bath at 50° C. and thereafter for a further 8 hours at room temperature. After filtering off the reaction product and recrystallizing from ether, 2-amino-3-carbethoxy-5,7- bis-(m-chlorophenyl)-4,5-dihydro - 7H - thieno[2,3-c]thiopyrane of the formula

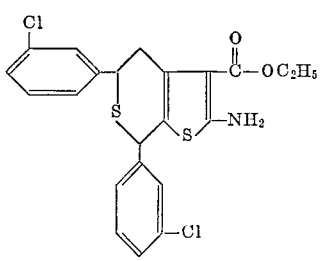

of melting point 145–149° C. is obtained.

The 2,6 - bis-(m-chlorophenyl)-2,3,5,6-tetrahydro-thiopyran-4-one used as the starting product may for example be manufactured as follows:

90 g. of 1,5-bis-(m-chlorophenyl)-penta-1,4-dien-3-one and 80 g. of anhydrous sodium acetate in 3 l. of 90% strength ethanol are heated to boiling whilst stirring. By introducing a stream of hydrogen sulfide gas for 6 hours and subsequently adding 2 l. of water whilst cooling, 2,6-bis-(m-chlorophenyl)-2,3,5,6-tetrahydro-thiopyran-4 - one is obtained in the form of white crystals of melting point 166–167° C. after recrystallization from ethyl acetate.

EXAMPLE 9

20.3 g. of 2,6-bis-(2,4-dichlorophenyl)-2,3,5,6-tetrahydro-thiopyran-4-one, 5.65 g. of ethyl cyanacetate, 1.6 of powdered sulfur and 5 ml. of morpholine are suspended in 100 ml. of absolute ethanol and stirred for 6 hours in a bath at 50° C. and thereafter for a further 8 hours at room temperature. The reaction product is filtered off and recrystallized from ethanol. 2-amino-3-carbethoxy-5,7-bis-(2,4-dichlorophenyl)-4,5-dihydro - 7H - thieno[2,3-c]thiopyrane of the formula

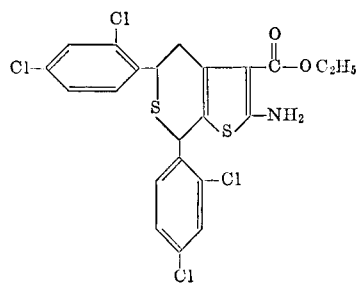

of melting point 140–160° C. is thus obtained.

The 2,6-bis-(2,4-dichlorophenyl)-2,3,5,6 - tetrahydro-thiopyran-4-one used as the starting product may for example be manufactured as follows:

29 g. of 1,5-bis-(2,4-dichlorophenyl)-penta-1,4-dien-3-one and 25 g. of anhydrous sodium acetate in 1 l. of 90% strength ethanol are heated to boiling whilst stirring. By introducing a stream of hydrogen sulfide gas for 5 hours and adding 500 ml. of water whilst cooling, 2,6-bis-(2,4-dichlorophenyl)-2,3,5,6-tetrahydro-thiopyran-4-one is obtained in the form of white crystals of melting point 167–170° C. after recrystallization from ethyl acetate.

EXAMPLE 10

33.7 g. of 2,6-bis-(para-chlorophenyl)-2,3,5,6-tetrahydro-thiopyran-4-one, 7.4 g. of cyanacetamide, 3.2 g. of powdered sulfur, and 10 ml. of morpholine are stirred in 100 ml. of absolute ethanol for 6 hours in a bath of 50–55° C., and then for 10 hours at room temperature. The reaction solution is slowly added dropwise to 400 ml. of water, then, together with the resulting solid precipitate, filtered with suction, and dried at room temperature. On recrystallization from benzene, 2-amino-3-carbamyl-5,7-bis-(para-chlorophenyl)-4,5-dihydro - 7H - thieno[2,3-c]-thiopyrane of the formula

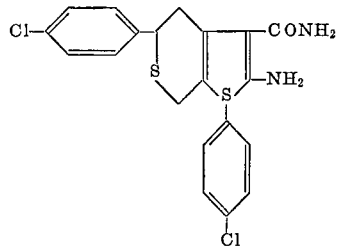

is obtained which melts at 221–223° C.

EXAMPLE 11

16.85 g. of 2,6-bis-(para-chlorophenyl)-2,3,5,6-tetrahydrothiopyran-4-one, 3.3 g. of malonic acid dinitrile, 1.6 g. of powdered sulfur, and 5 ml. of morpholine are stirred in 100 ml. of absolute ethanol for 8 hours in a bath of 50° C. and then for 10 hours at room temperature. The precipitate is filtered off and recrystallized from ethyl acetate, and 2-amino-3-cyano-5,7-bis-(para-chlorophenyl)-4,5-dihydro-7H-thieno[2,3-c]thiopyrane of the formula

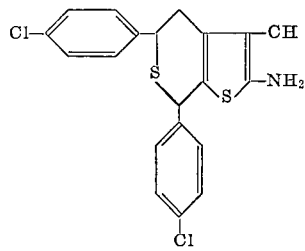

obtained in the form of white crystals which melt at 231–233° C.

EXAMPLE 12

A mixture of 5.4 g. of 2,6-diphenyl-2,3,5,6-tetrahydro-thiopyran-4-one and 3.4 g. of cyanacetic acid ethyl ester is heated in an oil bath of 150° C. for 6 hours using a water separator. The melt obtained on cooling is triturated with isopropyl ether and then recrystallized from absolute ethanol. There is obtained in this manner 2,6-diphenyl-4-(cyano-carbethoxy-methylene) - 2,3,5,6 - tetrahydro-thiopyrane of the formula

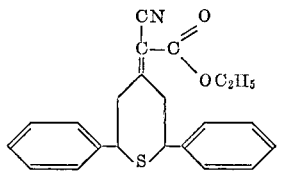

in the form of crystals which melt at 121–122° C.

36.3 g. of this compound, 3.2 g. of powdered sulfur and 10 ml. of morpholine are suspended in 100 ml. of absolute ethanol and the suspension stirred for 2 hours in a bath of 45° C. The batch is allowed to stand for 15 hours, and the precipitated reaction product then filtered with suction and washed with ethanol. There is obtained a mixture of the cis- and trans-forms of 2-amino-3-carbethoxy - 5,7-diphenyl-4,5-dihydro-7H-thieno[2,3-c]thiopyrane of the formula

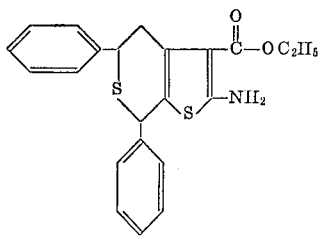

which, when recrystallized from absolute ethanol, forms yellowish crystals melting at 212–214° C.

EXAMPLE 13

3.95 g. of a mixture of cis- and trans-2-amino-3-carbethoxy - 5,7 - diphenyl - 4,5 - dihydro-7H-thieno[2,3-c] thiopyrane are refluxed for 2 hours and a half in a mixture of 400 ml. of ethanol and 100 ml. of 2 N-sodium hydroxide solution. The hot reaction mass is filtered to remove some undissolved matter, then evaporated under reduced pressure to a volume of about 100 ml. The pH is then adjusted to 1 with dilute hydrochloric acid, and the precipitated product is triturated with water. Recrystallization from ethanol gives 2-amino-3-carboxy-5,7-diphenyl-4,5-dihydro-7H-thieno[2,3-c]thiopyrane of the formula

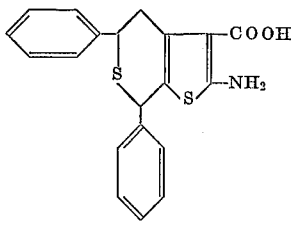

in the form of brownish crystals melting at 190–192° C.

What is claimed is:

1. A member selected from the group consisting of compounds of the formula

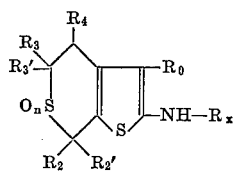

in which $n$ stands for an integer from 0 to 2, $R_x$ stands for a member selected from the group consisting of hydrogen and the group

R representing a member selected from the group consisting of hydrogen, lower alkyl, lower alkenyl, phenyl-lower alkyl, lower alkyl-phenyl-lower alkyl, lower alkoxyphenyl-lower alkyl, halogenophenyl-lower alky, trifluoromethyl-phenyl-lower alkyl, phenyl, lower alkylphenyl, lower alkoxyphenyl, halogenophenyl and trifluoromethylphenyl, lower cycloalkyl, and lower cycloalkyl-alkyl, $R_0$ stands for a member selected from the group consisting of carboxyl, carbamoyl, cyano and a group of the formula

$R_z$ representing a member selected from the group consisting of lower alkyl, lower alkenyl, lower cycloalkyl, lower cyclo-alkyl-alkyl, phenyl-lower alkyl, lower alkyl-phenyl-lower alkyl, lower alkoxy-phenyl-lower alkyl, halogeno-phenyl-lower alkyl and trifluoromethyl-phenyl-lower alkyl, $R_2$ and, $R_3$ each stands for a radical of the formula

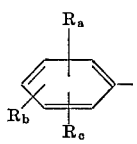

in which $R_a$, $R_b$ and $R_c$ each stands for a member selected from the group consisting of hydrogen, lower alkyl, lower alkoxy, halogen, trifluoromethyl, hydroxy, nitro, amino, mono-lower alkylamino, di-lower alkylamino, lower alkanoyloxy, benzoyloxy, phenyl-lower alkanoyloxy, lower alkanoylamino, benzoylamino and phenyl-lower alkanoylamino and, when taken together, two of the said three symbols in adjacent positions for methylenedioxy, and $R_2'$ and $R_3'$ each stands for a member selected from the group consisting of hydrogen; and lower alkyl, $R_4$ stands for a member selected from the group consisting of hydrogen and lower alkyl.

2. A prdouct as claimed in claim 1, in which $R_x$ stands for a member selected from the group consisting of lower alkanoyl and hydrogen, $R_0$ stands for a member selected from the group consisting of lower carbalkoxy, carboxyl, carbamoyl and cyano, $R_2'$ and $R_3'$ stand for hydrogen, $R_4$ for a member selected from the group consisting of lower alkyl and hydrogen and $R_2$ and $R_3$, each stands for a group of the formula

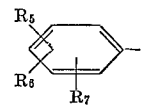

$R_5$, $R_6$ and $R_7$ each representing a member selected from the group consisting of hydrogen, lower alkyl, lower alkoxy, halogen and trifluoromethyl.

3. A product as claimed in claim 1, in which $n$ stands for O, $R_x$, $R_2'$, $R_3'$ and $R_4$, each stands for hydrogen, $R_0$ stands for a member selected from the group consisting of lower carbalkoxy, carboxyl, carbamoyl and cyano, and $R_2$ and $R_3$, each stands for the group of the formula

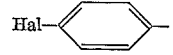

in which Hal stands for a member selected from the group consisting of fluorine, chlorine and bromine.

4. A product as claimed in claim 1, which product is the 2 - amino - 3 - carbethoxy - 5,7 - diphenyl - 4,5 - dihydro-7H-thieno[2,3-c]thiopyrane.

5. A product as claimed in claim 1, which product is the 2 - amino - 3 - carbethoxy - 5,7 - bis - (para-chlorophenyl) - 4,5 - dihydro - 7H - thieno [2,3-c]thiopyrane.

6. A product as claimed in claim 1, which product is the 2 - amino - 3 - carbethoxy - 5,7 - bis - (para-tolyl)-4,5-dihydro-7H-thieno[2,3-c]thiopyrane.

7. A product as claimed in claim 1, which product is the 2 - amino - 3 - carbethoxy - 5,7 - bis - (para-methoxyphenyl)-4,5-dihydro-7H-thieno[2,3-c]thiopyrane.

8. A product as claimed in claim 1, which product is the 2 - amino - 3 - carbethoxy - 5,7 - bis - (3,4,5-trimethoxyphenyl)-4,5-dihydro-7H-thieno[2,3-c]thiopyrane.

9. A product as claimed in claim 1, which product is the 2 - amino - 3 - carbethoxy - 5,7 - bis - (para-fluorophenyl) - 4,5 - dihydro - 7H - thieno[2,3-c]thiopyrane.

10. A product as claimed in claim 1, which product is the 2 - amino - 3 - carbethoxy - 5,7 - bis - (ortho-chlorophenyl) - 4,5 - dihydro - 7H - thieno[2,3-c]thiopyrane.

11. A product as claimed in claim 1, which product is the 2 - amino - 3 - carbethoxy - 5,7 - bis - (meta-chlorophenyl) - 4,5 - dihydro - 7H - thieno [2,3-c]thiopyrane.

12. A product as claimed in claim 1, which product is the 2 - amino - 3 - carbethoxy - 5,7 - bis - (2,4-dichlorophenyl) - 4,5 - dihydro - 7H - thieno[2,3-c]thiopyrane.

13. A product as claimed in claim 1, which product is the 2 - amino - 3 - carbamyl - 5,7 - bis - (para-chlorophenyl) - 4,5 - dihydro - 7H - thieno [2,3-c]thiopyrane.

14. A product as claimed in claim 1, which product is the 2 - amino - 3 - cyano - 5,7 - bis - (para-chlorophenyl) - 4,5 - dihydro - 7H - thieno[2,3-c]thiopyrane.

15. A product as claimed in claim 1, which product is the 2 - amino - 3 - carboxy - 5,7 - diphenyl - 4,5 - dihydro-7H-thieno[2,3-c]thiopyrane.

References Cited

Cogniant et al., C. A. 61:10665 (1964).

HENRY R. JILES, Primary Examiner

C. M. SHURKO, Assistant Examiner

U.S. Cl. X.R.

260—239.65, 251 A, 256.5 R, 326.12, 329 HS, 332.2 R, 332.2 C, 332.3 P, 332.5, 294.8 C, 999